United States Patent [19]

Chan

[11] Patent Number: 5,107,332
[45] Date of Patent: Apr. 21, 1992

[54] METHOD AND SYSTEM FOR PROVIDING CLOSED LOOP COLOR CONTROL BETWEEN A SCANNED COLOR IMAGE AND THE OUTPUT OF A COLOR PRINTER

[75] Inventor: C. S. Chan, Boise, Id.

[73] Assignee: Hewlett-Packard Company, Palo Alto, Calif.

[21] Appl. No.: 353,859

[22] Filed: May 17, 1989

[51] Int. Cl.⁵ ............................................. H04N 1/46
[52] U.S. Cl. ......................................... 358/80; 358/75
[58] Field of Search ........................ 358/75, 75 IJ, 80

[56] References Cited

U.S. PATENT DOCUMENTS

| | | | |
|---|---|---|---|
| 4,727,425 | 2/1988 | Mayne et al. | 358/80 |
| 4,752,822 | 6/1988 | Kawamura | 358/80 |
| 4,805,013 | 2/1989 | Dei et al. | 358/80 |
| 4,839,772 | 6/1989 | Barry et al. | 358/75 X |
| 4,901,258 | 2/1990 | Akiyama | 358/80 X |
| 4,929,978 | 5/1990 | Kanamori et al. | 358/80 X |

Primary Examiner—Howard W. Britton
Assistant Examiner—Mark R. Powell
Attorney, Agent, or Firm—William J. Bethurum

[57] ABSTRACT

A method and system for continuously correcting for errors in color output of a color copier or printer and caused by events that occur between the input of a color image scanner and the output of a copier or printer driven thereby. This method and system includes, among other things, the continuous comparison of input test pattern data, $TP_{in}$, from a small color gamut or "patch" having only a selected few number of color pixels therein with the output test pattern data, $TP_{out}$, from a color printer or copier to generate a color correction conversion factor, H. Then, H is used to continuously update an initial full scale look up table which was initially prepared from a full scale color gamut. The initial look up table has a color conversion factor, $F_{old}$, and H is used to convert $F_{old}$ to $F_{new}$ where $F_{new} = H \cdot F_{old}$. In this manner, H continuously corrects for undesirable changes in parameters used to generate the initial look up table, such as quality of print media, ink, dye loading, ink drop volume, pen types and the calibration of system devices.

11 Claims, 6 Drawing Sheets

Fig. 5

METHOD AND SYSTEM FOR PROVIDING CLOSED LOOP COLOR CONTROL BETWEEN A SCANNED COLOR IMAGE AND THE OUTPUT OF A COLOR PRINTER

TECHNICAL FIELD

This invention relates generally to color correction techniques used in digital color printing and more particularly to improving the color print quality of color printers and color copiers. The present invention provides a method and means for continuously matching the color output of a color printer with the color of an image read by a scanner which feeds the printer.

BACKGROUND ART

In the fields of color copying and color printing, it is known to convert red, blue, and green (R,B,G) output data from a scanner into corresponding cyan, yellow, magenta and black (C,Y,M,K) data and then to further process and refine this C,Y,M,K data before using same to drive a color printer. One such conversion system is described, for example, in U.S. Pat. No. 4,930,018 of C. S. Chan et al entitled "Method and System For Enhancing the Quality of Both Color and Black and White Images Produced by Ink Jet Printers", assigned to the present assignee and incorporated fully herein by reference. Other related types of color conversion systems are disclosed in Clark et al U.S. Pat. No. 4,477,833 Yoshida et al U.S. Pat. No. 4,719,490, and Myers U.S. Pat. No. 4,751,490, all incorporated herein by reference.

Using the color conversion technique described and claimed in my above co-pending application, it becomes necessary to employ a large and complete color gamut in order to generate a data bank or memory known as a "look up table" or LUT. This look up table is in turn stored in the memory of a computer and then used by the computer for converting the received red, blue, and green data to cyan, magenta, yellow, and black data which is in turn used to drive a color printer This complete color gamut should be prepared on the same type of print media and using the same type of ink, pen, drop volume and dye loading as is expected to be used by the color printer or copier under control of an image scanner. This operation is necessary in order to provide the best possible color match between the hardcopy output of the color printer and the scanned color image which is converted to C,Y,M & K data for driving the color printer. A color mismatch or color distortion will occur between the colors in the scanned image and the colors in the hardcopy output of the color printer when there is a change over time in any one of the above original parameters of print media, ink, dye, pen type, or drop volume. Furthermore, the above color mismatch or distortion will also be caused by changes in calibration which may occur over time to the separate calibration systems which are, respectively, part of the image scanner and a densitometer which is used to convert the color gamut into its R,G, & B components.

One solution to the above problem of color mismatch is to continuously update the full color gamut every time there is a change in one of the above five print parameters or in the calibrations of the scanner and densitometer. However, such a continuous updating of the large scale color gamut is very expensive and time consuming for reasons described in more detail below.

DISCLOSURE OF INVENTION

Accordingly, it is an object of the present invention to provide an improved and relatively inexpensive method and system for providing good color match between the image read by a color scanner and the hardcopy output of a color printer or copier controlled thereby.

Another object is to provide a new and improved method and system of the type described which does not require continuous updating of a large color gamut and the computational expenses associated therewith.

Another object of this invention is to provide a new and improved method and system of the type described which is readily adaptable to incorporation into existing color copiers and printers and which may be used with various types of printers such as thermal ink jet printers, thermal printers, electrostatic printers and the like.

These and other objects and attendant advantages of this invention are accomplished by the provision of a method and system of color correction wherein initially a large color gamut is prepared and utilized to generate an initial look up table for storage into the memory of a computer. This look up table is based upon a preselected print medium, ink, dye loading, pen type, and drop volume. A pre-generated test pattern, $TP_{in}$, derived from a small chosen color gamut is then fed through a scanner which is operative to generate R,G,B output data. This R,G,B output data is in turn fed to the above computer where the above look up table converts it to C,Y,M,K data and processes this C,Y,M,K data to a color printer using standard error diffusion and pixel assignment procedures such as those described in my above identified copending application or other order dither methods. The output data of the color printer is designated as $TP_{out}$, and this output test pattern $TP_{out}$ is fed back to the scanner to generate another set of R,G,B data. Then, using standard mathematical conversion procedures, a conversion factor, H, is obtained in accordance with the relationship:

[Equation 1:] $$TP_{in} = H \cdot TP_{out} \quad \text{Eq. 1}$$

where H is a matrix mapping function used for mapping $TP_{out}$ to $TP_{in}$.

The sequence of steps of this novel method embodying my invention includes providing a full scale color gamut based upon preselected parameters such as print media, inks, dyes, drop volumes and pen types; constructing an initial look up table based upon this full scale color gamut; storing this initial look up table in a computer, comparing a sample test pattern of input information, $TP_{in}$, read from a small color gamut or "patch" by a color image scanner with a test pattern of output information, $TP_{out}$, generated by a color printer; generating a corresponding correction factor, H, as defined by Equation 1 above; and then using this correction factor H to continuously update the initial look up table which is stored in a computer memory. In this manner, the color differences between the image scanned by the image scanner and the hardcopy output of a color printer are always minimized.

The above objects and other advantages and unique features of this invention will become better understood with the reference to the following description of the accompanying drawings.

The file of this patent contains at least one drawing executed in color. Copies of this patent with color drawings will be provided by the Patent and Trademark Office upon request and payment of the necessary fee.

BRIEF DESCRIPTION OF THE DRAWINGS

FIGS. 5 and 6 are large and small color gamuts, respectively, which are typical of those useful in practicing the invention.

DESCRIPTION OF THE PREFERRED EMBODIMENT

Figure 1:
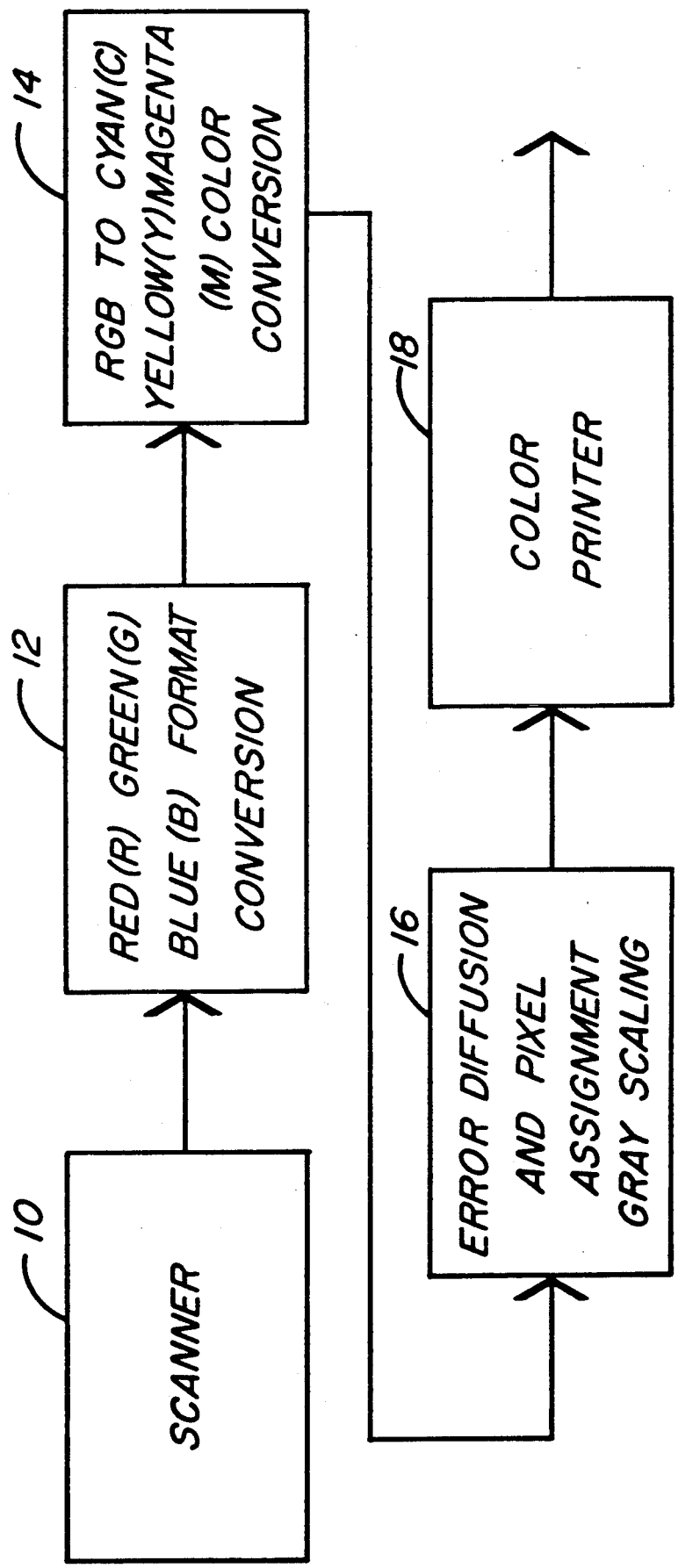
FIG. 1 is a functional block diagram of one type of image conversion system in which the present invention may be incorporated.

Referring now to FIG. 1, the image conversion system shown herein is of the type described in my above copending U.S. Pat. No. 4,930,018 and is just one type of system with which the present invention may be used. In this system in FIG. 1 a scanner 10 is used to convert a color image into digital gray scale data for application to an additive red-green-blue (R-G-B) format conversion stage 12. The R-G-B output data from the format conversion stage 12 is applied as indicated to the subtractive color primaries cyan-yellow-magenta (C-Y-M) color conversion stage 14 in a well known manner and including 100% undercolor removal to obtain black. A chromatic color (black) cannot be easily made by mixing Y-M-C ink colors, and such mixing will increase the amount of ink consumed. Therefore, the black created by Y,M,C colors is preferably replaced by pure black (K). This replacement and the generation of pure black is known in the art as undercolor removal (UCR). The use of 100% undercolor removal is for the purpose of minimizing ink consumption and to improve resolution. The equation for 100% UCR for colors C, M, Y and K is K=min (C, M, Y) where the new C=C-K, the new M=M-K and the new Y=Y-K.

The output of the C-Y-M color conversion stage 14 is a digital data stream which is applied to the error diffusion and pixel assignment stage 16, and the latter stage 16 in turn drives a color printer 18, preferably a thermal ink jet color printer. The general functional arrangement of the image scanning and color reproduction system of FIG. 1 is well known in the image processing art. The image processing operation and capability of such a system is described, for example, in the March 1987 issue of BYTE Magazine in an article by B. M. Dawson entitled "Introduction To Image Processing Algorithms" at page 169 et seq. Such image processing capability and corresponding system operation is also described in a publication by Gary Dispoto et al entitled *Designer's Guide to Raster Image Printer Algorithms,* First Edition, December 1986, Copyrighted by and available from the Hewlett-Packard Company in Palo Alto, Calif. Both of these latter references are incorporated herein by reference.

The processes of error diffusion and pixel assignment in stage 16 of FIG. 1 in a gray scaling image processing operation are also generally well known in this art.

Error diffusion is a technique used to disperse to the neighboring pixels the error between a printable gray scale and the input image gray scale data. This error diffusion has been frequently carried out using a selected one of many well known algorithms such as those discussed in the above identified Dawson article. As an example, this error diffusion may be carried our using either one of two well known algorithms in this art, namely, Floyd and Steinberg's 4-point algorithm and Stucki's 12-point algorithm.

Figure 2:
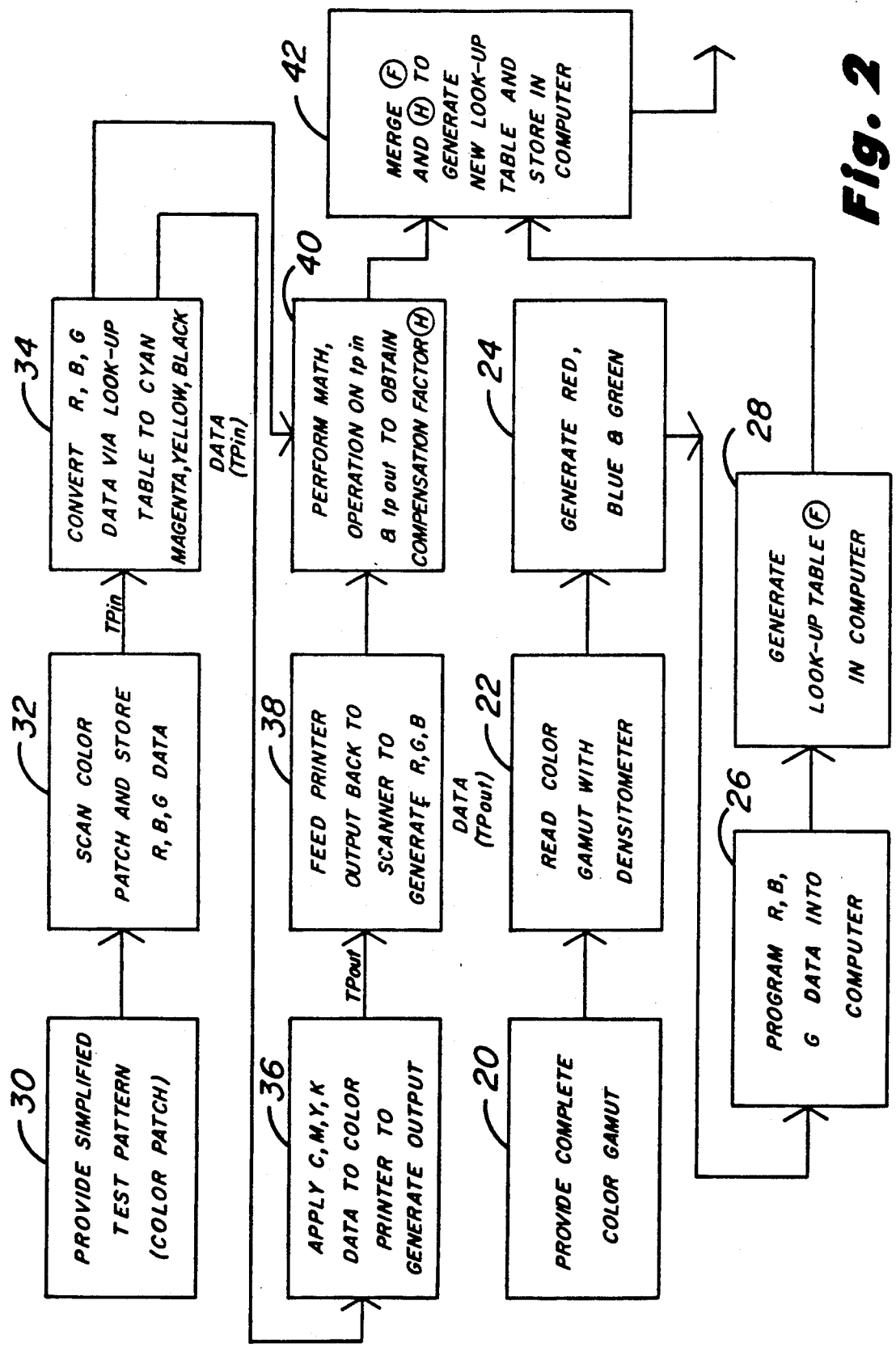
FIG. 2 is a flow chart depicting the data processing methodology for practicing the present invention.
Figure 5:
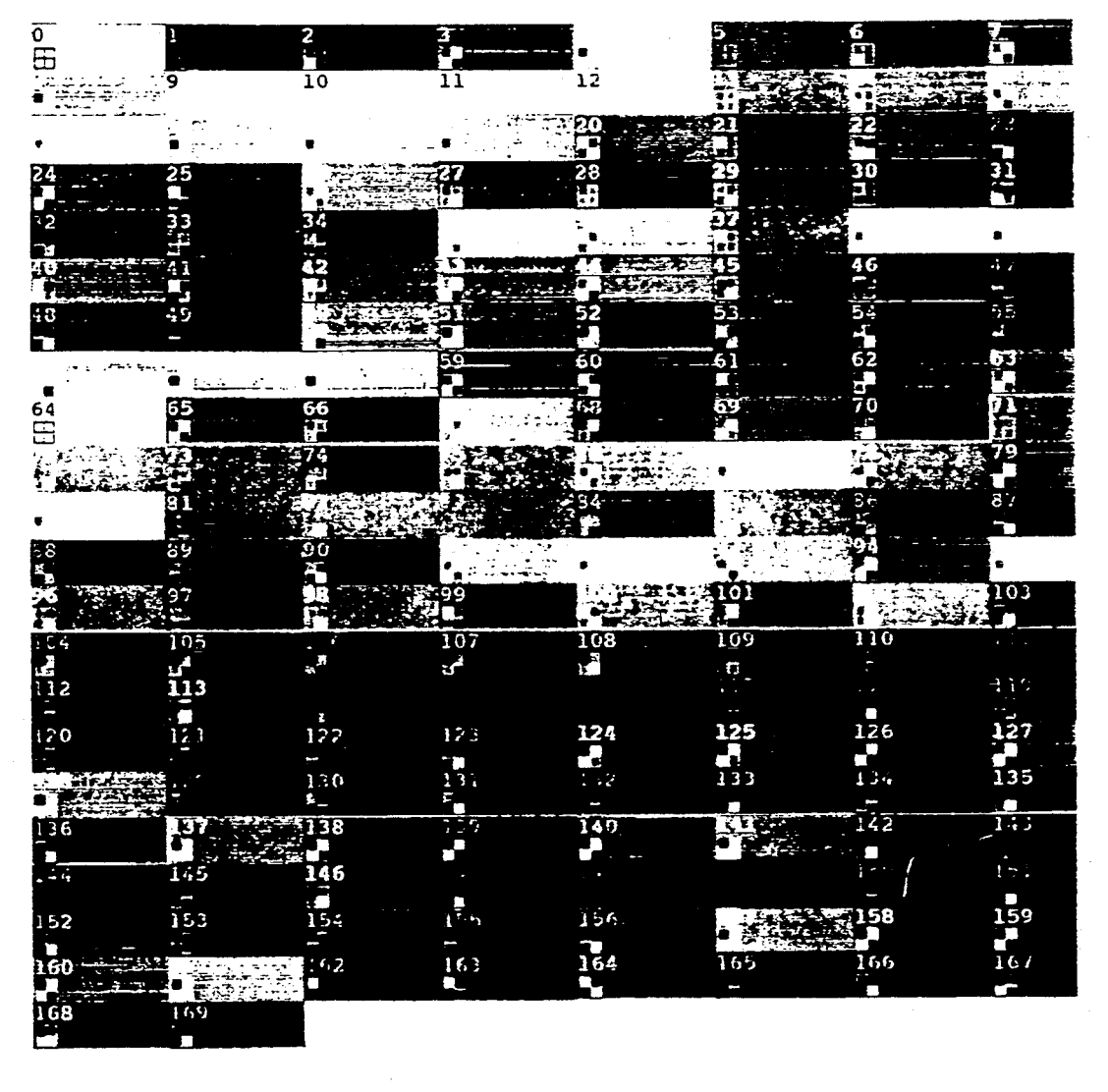

Referring now to FIG. 2, this FIGURE will be described in terms of sequential signal processing steps, including providing a complete color gamut at step 20, and this color gamut may consist typically of up to 200 color patches arranged in an X-Y matrix. This complete color gamut is shown in FIG. 5 herein and is read by a densitometer at step 22 to in turn generate filtered red, green, and blue data at step 24. This data from step 24 is then programmed at step 26 into either a separate computer or a computer located within a color printer where it is used to generate a look up table at step 28. A comprehensive color gamut is required here to adequately cover the entire color space when generating the initial look-up table for storage into computer memory.

Figure 6:
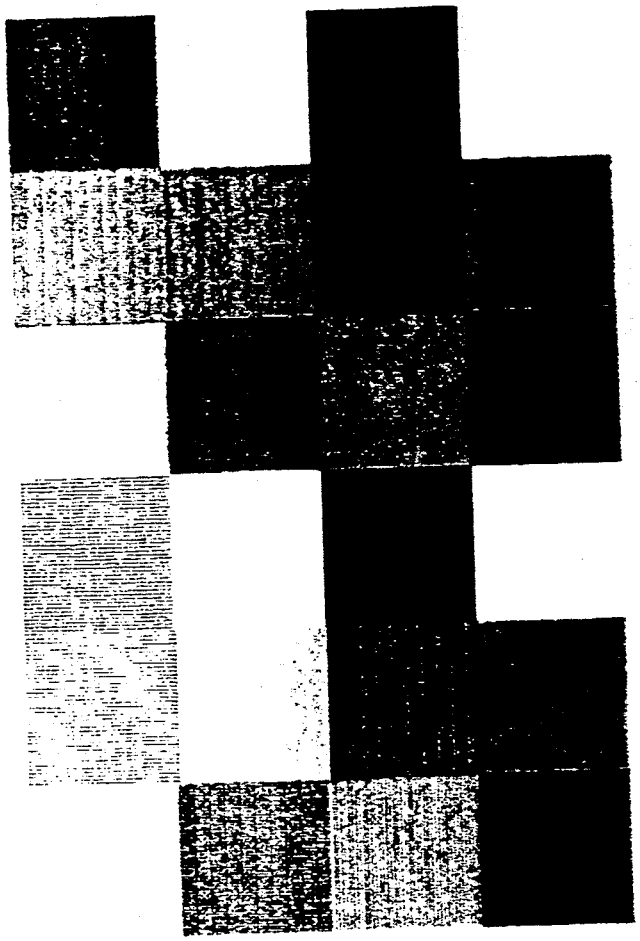

A simplified test pattern such as the one shown in FIG. 6 herein is provided as indicated at step 30 and may include, for example, a 4×6 matrix of R,G,B patches and C,Y,M patches arranged in adjacent rows and columns. The simplified test pattern ("patch") provided in step 30 is scanned using a conventional color scanner at step 32 to in turn generate R,G,B input test pattern ($TP_{in}$) data for application to a computer. The $TP_{in}$ data from step 32 is then processed through the initial look up table previously stored in a computer memory to generate corresponding C,M,Y and K output data as indicated at step 34. The C,M,Y and K data in step 34 is related to the R,G,B data by a first transformation matrix or conversion factor, F, and the data from step 34 is applied to a color printer to generate output test pattern data, $TP_{out}$, at step 36. The test pattern output data $TP_{out}$ at step 36 is then fed back to the same scanner that is used in step 32 above and is further used in step 38 to generate corresponding output R,G,B data from the color scanner and representative of $TP_{out}$. The $TP_{out}$ data from the color scanner in step 38 is then applied to the computer at step 40 where $TP_{out}$ R,G,B data is compared therein to $TP_{in}$ R,G,B data to in turn generate a compensation matrix H. This compensation matrix is also referred to herein as a second transformation matrix or second conversion factor, H, and is defined in Equation 1 above.

The second transformation matrix, H, is then mathematically merged in step 42 with the previously identified first transformation matrix or conversion factor F to generate a new updated color look up table to be stored in either a separate computer or a computer which is located in a color printer or color copier.

The computational effort, e.g. time, for generating the first transformation matrix or conversion factor, F, used to obtain the above R,G & B components for the initial look up table depends upon the dimensions of the full scale color gamut in FIG. 5. To a first order approximation, this computational effort is proportional to $N^3$, where N is the number of patches in the color gamut. For example, in generating the conversion factor F for a 20×20 patch matrix, N will be 20×20 or 400 and $N^3$ will equal $64 \times 10^6$ floating point operations. However, in generating the second transformation matrix, H, the dimension of the input vector N is 24 for 6×4 color patches; hence $N^3 = 13,824$ floating point operations. In the above example, not only is there provided a substantial saving in computational cost, but in addition a significant amount of time is saved in preparing the color gamut input data $TP_{in}$. This updating procedure continuously corrects for the drifting in the calibration of the equipment used as well as changes in the parameters of ink, pen, paper, drop volume, dye loading or other similar parameters that may change over time. The use of the smaller 4×6 color gamut (FIG. 6) is sufficient for use in the updating process inasmuch as most of the correct color information is already present in the then-existing color look up table, and only minor color corrections are needed. Furthermore, all of the major colors of the full color gamut color space are present in the 4×6 color patch matrix in FIG. 6 and are quite sufficient for use in the present continuous updating error correction process and provide excellent scanned image-to-hardcopy output color match.

Figure 3:
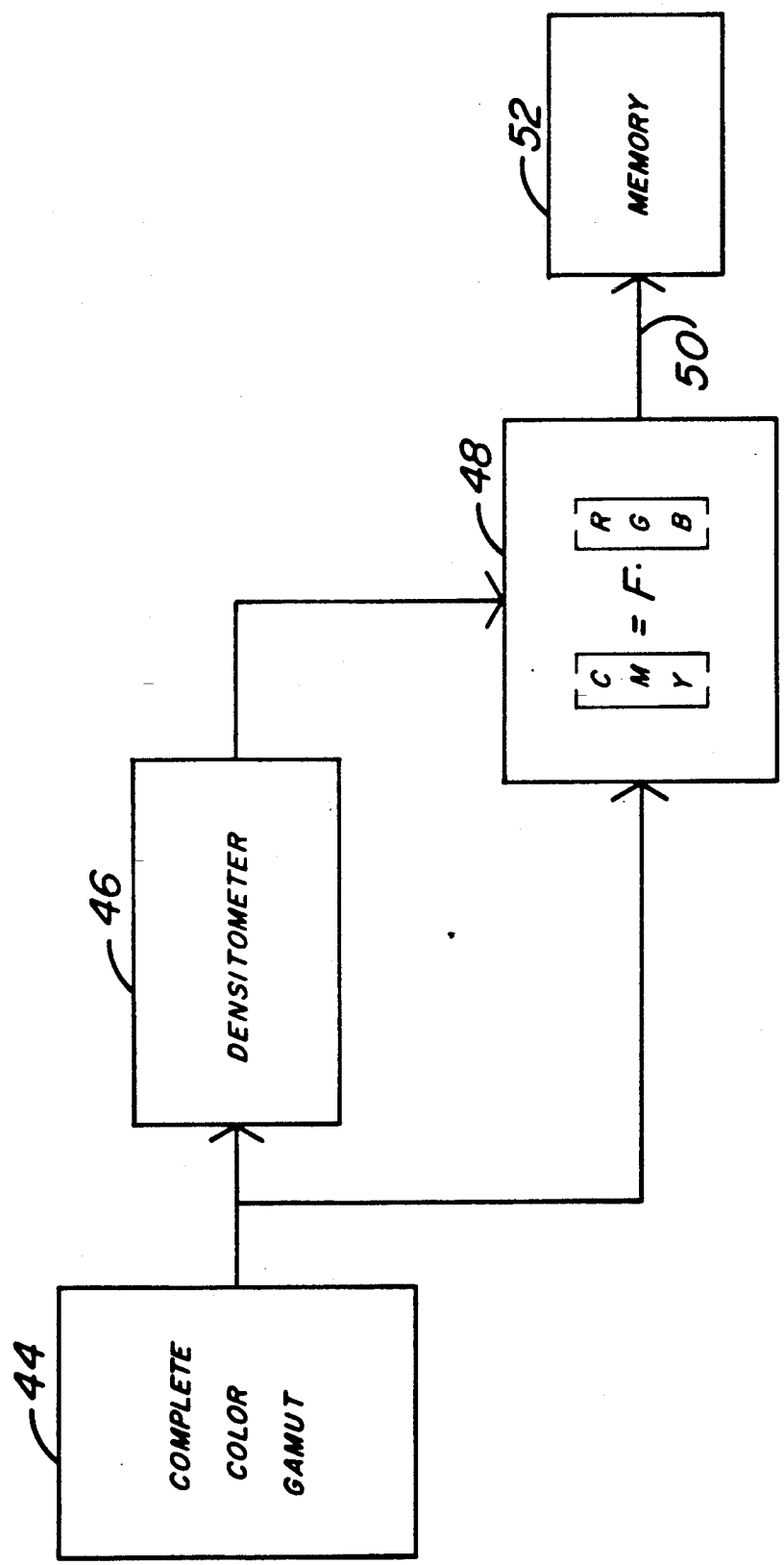
FIG. 3 is a functional block diagram corresponding to steps 20,22,24,26 and 28 in FIG. 2.

Referring now to FIG. 3 which shows the functional relationship between the complete color gamut, densitometer and memory for storing the initial LUT, a complete color gamut 4 is read by a densitometer 46 to convert the cyan, magenta and yellow information of all of the pixels of the color gamut to red, green and blue information. The mathematical relationship of mapping the RGB information into CMY information is shown in stage 48, and this mapping function is stored in the computer memory of stage 52 as a look up table.

Figure 4:
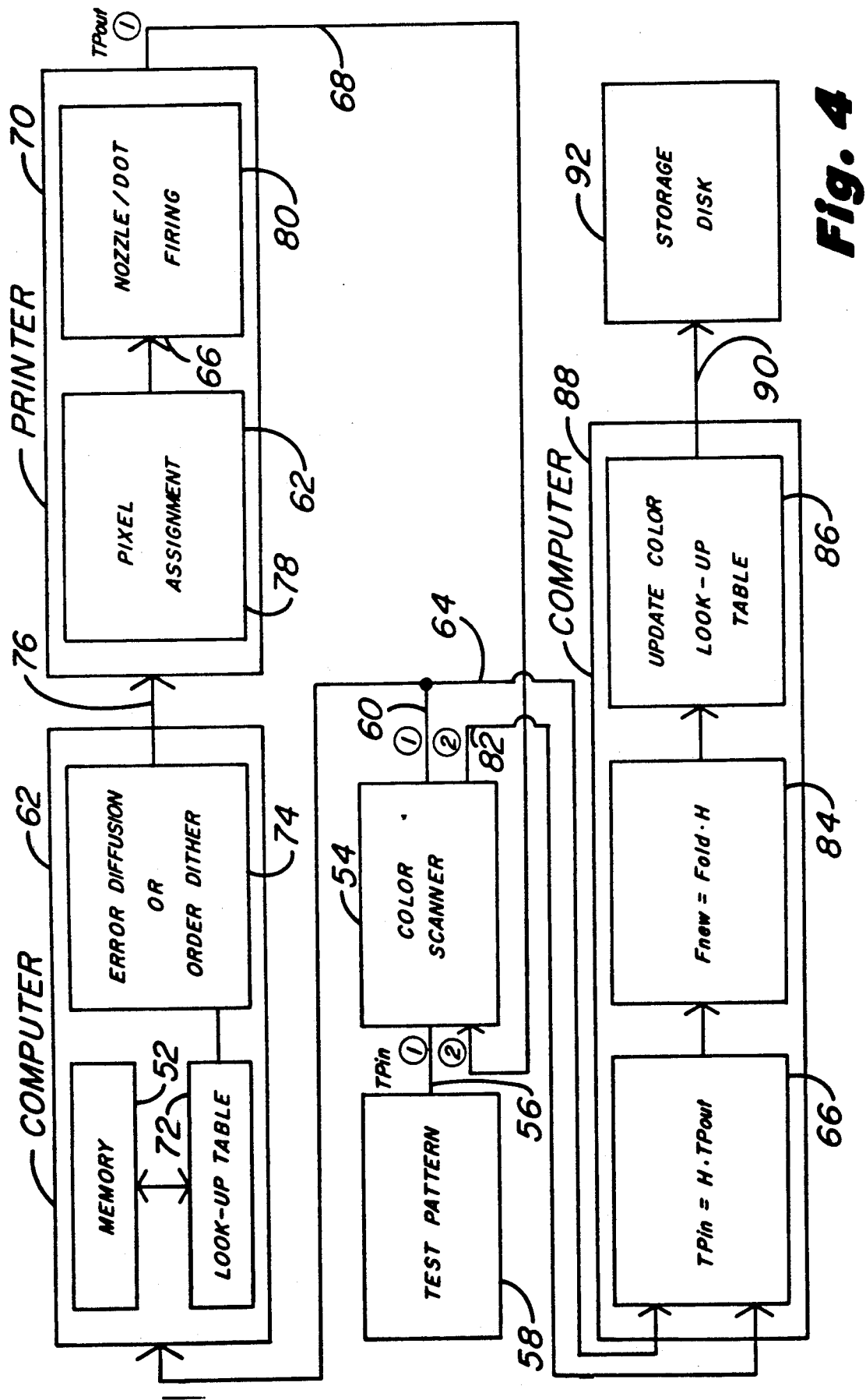
FIG. 4 functionally illustrates a data processing system for carrying out the steps of FIG. 1 and which can be implemented by those skilled in the art using existing off-the-shelf electronic products commercially available in the image processing and printer fields of technology.

Referring now to FIG. 4, as previously indicated, a color image scanner 54 is positioned and connected to receive red, green & blue data at a first input line 56 from a small simplified test pattern 58 consisting, for example, of a 6×4 matrix of R,G,B patches and C,Y,M,K patches arranged in adjacent rows and columns and shown in FIG. 6 hereof. The simplified test pattern or patch 58 is scanned by the scanner 54 to generate R,G,B input test pattern data, or $TP_{in}$ data, on the output 60 and applied to the memory stage 52 in the computer 62. This R,G,B data labeled $TP_{in}$ is also applied by way of line 64 to one input connection of a transformation or conversion algorithm stage 66.

The color scanner 54 is also connected to receive the output test pattern data, $TP_{out}$, in the feedback path 68 from the output of the color printer 70 and which is connected as a second input line feeding the scanner 54.

The memory stage 52 corresponds to the same numbered stage in FIG. 3 and is part of either a general purpose or special purpose computer 62 which also includes a continuously updated look up table 72. The output of the LUT 72 is connected to an error diffusion or order dither stage 74, and the output line 76 of stage 74 is connected to drive the color printer 70. The color printer 70 may, for example, include an input pixel assignment stage 78 which drives a nozzle firing stage 80 operative for generating R,G,B output test pattern data, $TP_{out}$, on output line 68 as shown.

The color scanner 54 continuously scans the $TP_{out}$ data for determining color variations therein and in turn generates this $TP_{out}$ data on line 82 which is applied as a second input signal to the transformation algorithm stage 66. The transformation algorithm in stage 66 is used to thus continuously update the first conversion factor F (generated from the initial look up table) by providing the second conversion factor, H. Thus, $F_{old}$ is continuously updated in stage 84 to $F_{new}$ by the relationship $F_{new} = H \cdot F_{old}$. The continuously updated new conversion factor, $F_{new}$, as indicated at the output of stage 84 is provided as input data to an updated color look up table in stage 86, where stages 66, 84 and 86 are all part of a second general purpose or special purpose computer 88. The output signal on line 90 from the updated color look up table in stage 86 is thus continuously applied as an input signal to a storage or memory device 92 as indicated in FIG. 4 and is used to continuously match the color of the hardcopy output with the color of the scanned image input to the color scanner 54. The storage device 92 can be the same as the memory stage 52.

The conversion factors F & H are matrix quantities defined by a plurality of polynomials representative of C, Y and M data within each scanned pixel of a color gamut. These matrix quantities are used to map the R,G,B density information into the C,M,Y color space, and are described in some detail in a paper by F.R. Clapper entitled "An Empirical Determination of Halftone Color-Reproduction Requirements", *Technical Association of the Graphics Arts*, Thirteenth Annual Meeting, June 12-14, 1961, pp. 31-41, incorporated herein by reference. Clapper describes how to map the R,G,B density information into the C,M,Y color space by the construction of either a set of linear or polynomial equations and by solving the coefficients thereof explicitly. However, this approach has the limitation that the number of equations and the number of coefficients (either linear or polynomial) must be matched. Hence, for a large number of color patches, this process will generate an unrealistically high order of equations, and the solution of the coefficients thereof may be very sensitive to the color patches being chosen.

Therefore, in accordance with the present invention, all of these equations were cast into a "least square error" problem whose advantage is that it is not now necessary to match the number of unknown polynomial coefficients with the number of equations which are a function of the number of color patches scanned. Thus, we are now free to choose the type of mapping relationship to be used, and this least square solution is accomplished as indicated below:

The outline of obtaining H in equation (1) is as follows: Given $TP_{in}$, $TP_{out}$ and the functional relationship for H, the task is to obtain a value for H such that the overall sum of squares of the error is minimized:

$$\text{Minimize } \Sigma e \cdot^2 = e^T e$$
$$= (TP_{in} - H \cdot TP_{out})^T (TP_{in} - H \cdot TP_{out})$$

This approach is known in the art as the least square minimization process, and is described, for example, in a well known classical textbook authored by Richard Bellman and entitled *Introduction To Matrix Analysis*, McGraw Hill Book Company Inc. 1960, incorporated herein by reference.

Various modifications may be made in the above-described embodiment without departing from the scope of this invention. For example, it is not necessary that the computers represented as 62 and 88 in FIG. 4 be separate computers and instead these units 62 and 88 may both be part of single more complex computer.

I claim:

1. A method for matching the color of an image read by a color image scanner and the printed hardcopy output of a copier or printer controlled by the scanner, which comprises the steps of:
   a. providing a full scale color gamut based upon preselected parameters such as print media, inks, dyes, drop volumes and pen types,
   b. constructing an initial look up table based upon said full scale color gamut and storing said initial look up table in a computer,
   c. comparing a sample test pattern of input information, $TP_{in}$, read by a scanner with a test pattern of output information, $TP_{out}$, generated by a color printer or color copier to in turn generate a corresponding transformation matrix, H, and
   d. utilizing said transformation matrix H to continuously update said initial look up table, so that the color differences between the image scanned by said color scanner and the hardcopy output of a color printer or color copier are always driven toward zero, corrected and minimized.

2. The method defined in claim 1 wherein the continuous updating of said look up table comprises multiplying a previously generated color conversion factor, $F_{old}$, by said transformation matrix, H, to obtain an updated color conversion factor, $F_{new}$.

3. A system for continuously matching the color of an image read by a color image scanner and the printed hard copy output of a copier or printer controlled by the scanner which comprises:
   a. color gamut means for providing a full scale color gamut based upon preselected parameters such as print media, inks, dyes, drop volumes and pen types,
   b. means for said color gamut means for constructing an initial up table based upon said full scale color gamut and of said initial look up table in memory,
   c. means for a sample test pattern of smaller color gamut information, $TP_{in}$, read by a scanner with a test pattern of output information, $TP_{out}$, generated by a color printer or color copier to thereby generate a corresponding transformation factor, H, and
   d. means for utilizing said transformation matrix, H, to continuously update said initial look up table, so that the color differences between the image scanned by said color scanner and the hardcopy output of a color printer or copier are always driven towards zero, corrected and minimized.

4. The system defined in claim 3 which includes:
   a. printer means responsive to data stored in said initial look up table for generating said output information, $TP_{out}$, and
   b. computer means connected to said printer means for said $TP_{out}$ information and further connected to said color scanner for receiving said $TP_{in}$ information and for generating said transformation matrix, H, where $TP_{in} = H \cdot TP_{out}$.

5. The system defined in claim 4 wherein said computer means further includes:
   a. means for continuously updating a previously generated color conversion factor, $F_{old}$, to a newly updated color conversion factor, $F_{new}$, where $F_{new} = H \cdot F_{old}$, and
   b. means for applying said updated color conversion factor $F_{new}$ to a color look up table for continuously updating said look up table which may be stored in memory.

6. A method for matching the color of an image read by a color image scanner and the printed hardcopy output of a copier or printer controlled by the scanner, which comprises the steps of:
   a. constructing an initial look up table based upon a full scale color gamut and storing said initial look up table in a computer,
   b. providing a small scale color gamut which is significantly less in size than the size of said full scale color gamut,
   c. scanning said small scale color gamut to thereby generate a sample test pattern of input information, $TP_{in}$,
   d. generating a test pattern of output information, $TP_{out}$, at the output of a color printer or copier to in turn generate a corresponding transformation matrix, H, in the equation $TP_{in} = H \cdot TP_{out}$, and
   e. utilizing and processing said transformation matrix, H, to continuously update said initial look up table, so that the color differences between the image scanned by said color scanner and the hardcopy output of a color printer or color copier are always minimized.

7. The method defined in claim 6 wherein the continuous updating of said look up table comprises multiplying a previously generated color conversion factor, $P_{old}$, by said transformation matrix, H, to obtain an updated color conversion factor, $F_{new}$.

8. The method defined in claim 7 wherein a small scale color gamut is provided and used for the generation of $TP_{in}$ and consists of a matrix of color patches having a size on the order of six rows and four columns of individual color patches, whereby to a first order approximation the computational effort to generate $TP_{in}$ is proportional to $N^3$, where N is the number of patches in said small scale color gamut.

9. A system for matching the color of an image read by a color image scanner and the printed hardcopy output of a copier or printer controlled by the scanner including, in combination:
   a. means including an initial look up table based upon a full scale color gamut and means for storing said initial look up table in a computer,
   b. means for providing a small scale color gamut which is significantly less in size than said full scale color gamut,
   c. means for scanning said small scale color gamut and thereby generating a sample test pattern of input information, $TP_{in}$,
   d. means connected to said computer for providing a test pattern of output information, $TP_{out}$, and generated by a color printer or copier to in turn generate a corresponding transformation matrix, H, where H is defined by the equation $TP_{in} = H \cdot TP_{out}$, and
   e. means connected to said color printer and operable to receive said transformation matrix, H, and being further operative to continuously update said initial look up table, so that the color differences between the scanned image read by said color scanner and the hardcopy output of a color printer or color copier are always minimized.

10. The system defined in claim 9 which further includes color conversion means connected to said transformation matrix generating means for continuously updating said look up table by multiplying a previously generated color conversion factor, $F_{old}$, by said transformation matrix, H, to obtain an updated color conversion factor, $F_{new}$.

11. The system defined in claim 10 wherein a small scale color gamut is provided and used in the generation of $TP_{in}$ and consists of a matrix of color patches having a size on the order of six rows and four columns of individual color patches, whereby to a first order approximation the computational effort to generate $TP_{in}$ proportional to $N^3$, where N is the number of patches in said small scale color gamut.

* * * * *